(12) United States Patent
Reis et al.

(10) Patent No.: US 12,233,761 B2
(45) Date of Patent: Feb. 25, 2025

(54) CARGO PARTITION LOCKING APPARATUS FOR A VEHICLE

(71) Applicant: Ford Global Technologies, LLC, Dearborn, MI (US)

(72) Inventors: Fabio Reis, Salvador (BR); Luiz Hurtado, Lauro de Freitas (BR); Luiz Kachel, Lauro de Freitas (BR); Marcos Juliano Rosaneli, Lauro de Freitas (BR); Paulo Neto, Camacari (BR)

(73) Assignee: Ford Global Technologies, LLC, Dearborn, MI (US)

( * ) Notice: Subject to any disclaimer, the term of this patent is extended or adjusted under 35 U.S.C. 154(b) by 344 days.

(21) Appl. No.: 17/977,035

(22) Filed: Oct. 31, 2022

(65) Prior Publication Data

US 2024/0140282 A1 May 2, 2024

(51) Int. Cl.
*B60N 2/36* (2006.01)
*B60R 5/04* (2006.01)

(52) U.S. Cl.
CPC ............... *B60N 2/366* (2013.01); *B60R 5/04* (2013.01)

(58) Field of Classification Search
CPC .................... B60N 2/366; B60R 5/04
See application file for complete search history.

(56) References Cited

U.S. PATENT DOCUMENTS

| 5,603,550 A * | 2/1997 | Holdampf ............... B60N 2/366 297/14 |
| 6,250,704 B1 * | 6/2001 | Garrido .................... B60N 2/06 296/65.09 |
| 6,908,137 B2 | 6/2005 | Doxey et al. |
| 2002/0033624 A1 * | 3/2002 | Konishi ................. B60N 2/366 297/336 |
| 2020/0378163 A1 | 12/2020 | Singh et al. |

FOREIGN PATENT DOCUMENTS

| CA | 2514457 A1 | 9/2004 |
| JP | 4870463 B2 | 2/2012 |

* cited by examiner

*Primary Examiner* — Mark R Wendell
(74) *Attorney, Agent, or Firm* — Vichit Chea; Price Heneveld LLP

(57) ABSTRACT

A cargo locking system for a vehicle, the cargo locking system includes a gate and a pivot bracket coupled with the gate. The cargo locking system also includes a latch radially extending from the pivot bracket. The latch is movable between a first position and a second position. The cargo locking system also includes an actuator coupled with the latch. The cargo locking system further includes a striker coupled with the gate. The striker is movable between an unlocked position and a locked position. The striker holds the latch in the first position when the striker is in the locked position.

15 Claims, 6 Drawing Sheets

CARGO PARTITION LOCKING APPARATUS FOR A VEHICLE

FIELD OF THE DISCLOSURE

The present disclosure generally relates to a partition locking assembly. More specifically, the present disclosure relates to a partition locking assembly for a vehicle.

BACKGROUND OF THE DISCLOSURE

Many vehicles include cargo spaces accessible via a seatback, a row of seatbacks, or even a panel. The cargo area often provides a storage area for storing items. Additionally, cargo space partitions often have an actuator to allow the partition to provide access to the cargo area.

SUMMARY OF THE DISCLOSURE

According to various examples, a cargo locking system (for a vehicle) includes a gate and a pivot bracket coupled with the gate. The cargo locking system also comprises a latch radially extending from the pivot bracket. The latch is movable between a first position and a second position. The cargo locking system also comprises an actuator coupled with the latch. The cargo locking system further comprises a striker coupled with the gate. The striker is movable between an unlocked position and a locked position. The striker holds the latch in the first position when the striker is in the locked position.

Embodiments of the present disclosure may include one or a combination of the following features:
  a lever coupled with the striker, wherein the lever actuates the striker between the locked position and the unlocked position from within the cargo space;
  the gate pivots to an open position when the latch is in the second position;
  activation of the actuator moves the latch between the first position and the second position when the striker is in the unlocked position, and wherein the actuator is prevented from actuating the latch when the striker is in the locked position;
  the gate is a seatback;
  the striker applies a biasing force to the gate, and wherein the biasing force directs the striker toward one of the locked position and the unlocked position;
  the gate includes indicia facing the cargo space, the indicia communicates when the striker is in the locked position and the unlocked position;
  the gate defines a cavity, and wherein the pivot bracket, the latch, and the striker are disposed within the cavity; and
  a housing, wherein the lever is accessed from within the housing.

According to various examples, a cargo locking system (for a vehicle) comprises a divider separating a cargo space from a cabin space within the vehicle. The cargo locking system also comprises a pivot bracket coupled with the divider. The cargo locking system also comprises a pivot latch movable between a first position and a second position, the pivot latch coupled with the pivot bracket. The cargo locking system also comprises a release actuator coupled with the pivot latch, the release actuator configured to actuate the pivot latch between the first position and the second position. The cargo locking system also comprises a protruding arm selectively engaged with the pivot latch. The cargo locking system also comprises a lever movable between a locked position and an unlocked position. The cargo locking system also comprises a shaft having a proximal end and a distal end and extending therebetween. The proximal end is coupled with the lever. The distal end is coupled with the protruding arm. The cargo locking system also comprises a mounting bracket coupled with the divider and a sleeve coupled with the mounting bracket. The sleeve is configured to house the shaft. The cargo locking system further comprises a lock cover coupled with the divider. The lock cover defines recess that houses the lever. The lock cover is accessed from within the cargo space.

Embodiments of the present disclosure may include one or a combination of the following features:
  the shaft comprises a biasing member, wherein the biasing member applies a biasing force to the sleeve;
  the sleeve defines locked notch and an unlocked notch, wherein the locked notch is configured to receive the biasing member when the lever is in the locked position, and wherein the unlocked notch is configured to receive the biasing member when the lever is in the unlocked position;
  the lock cover includes indicia of when the lever is in the locked position and the unlocked position; and
  the divider is a seatback.

According to various examples, a cargo locking system (for a vehicle) comprises a pivot bracket coupled with a lateral side of a cargo access panel. The cargo locking system also comprises a pivot latch movable between a first position and a second position. The pivot latch outwardly extends from the pivot bracket. The cargo locking system also comprises a release actuator coupled with the pivot latch. The release actuator is configured to actuate the pivot latch between the first position and the second position. The cargo locking system also comprises a protruding arm coupled with the lateral side of the cargo locking system. The protruding arm selectively engages the pivot latch. The cargo locking system also comprises a lever that is accessible from with a cargo space of the vehicle. The lever is coupled with the protruding arm. The lever transition the protruding arm between a locked position and an unlocked position.

Embodiments of the present disclosure may include one or a combination of the following features:
  the cargo access panel is a seatback having a depth;
  a shaft extending into the depth of the seatback, wherein a first end of the shaft is coupled with the protruding arm, and wherein a second end of the shaft is coupled with the lever;
  a sleeve, wherein the sleeve circumscribes the shaft;
  the shaft includes a biasing member that biases the lever to transition the protruding arm toward one of the locked positon and the unlocked position; and
  the seatback includes indicia communicating toward the cargo space when the protruding arm is in the locked position and the unlocked position.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
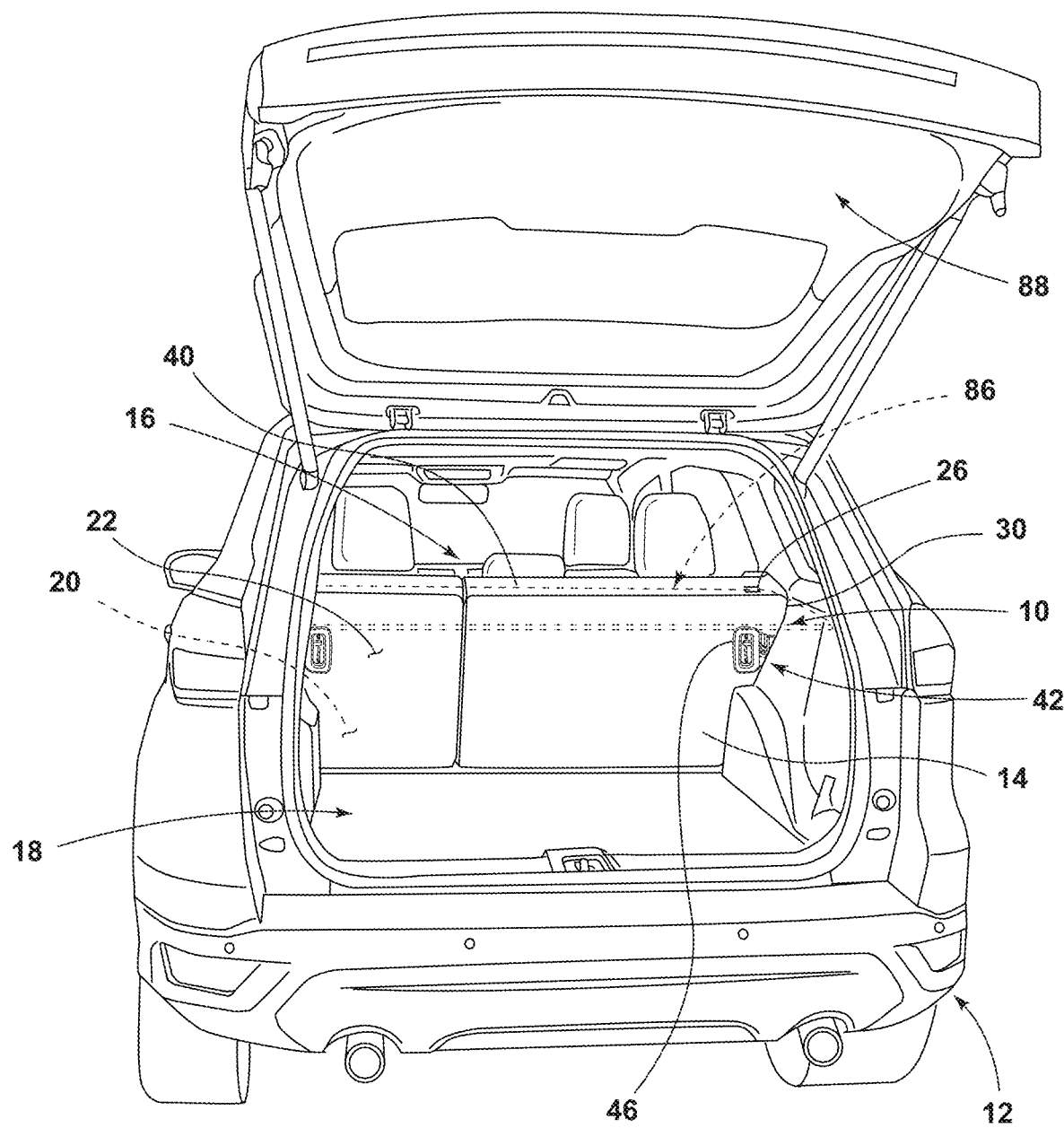
FIG. 1 is a rear perspective view of a vehicle with a cargo space and cargo locking system.
Figure 2:
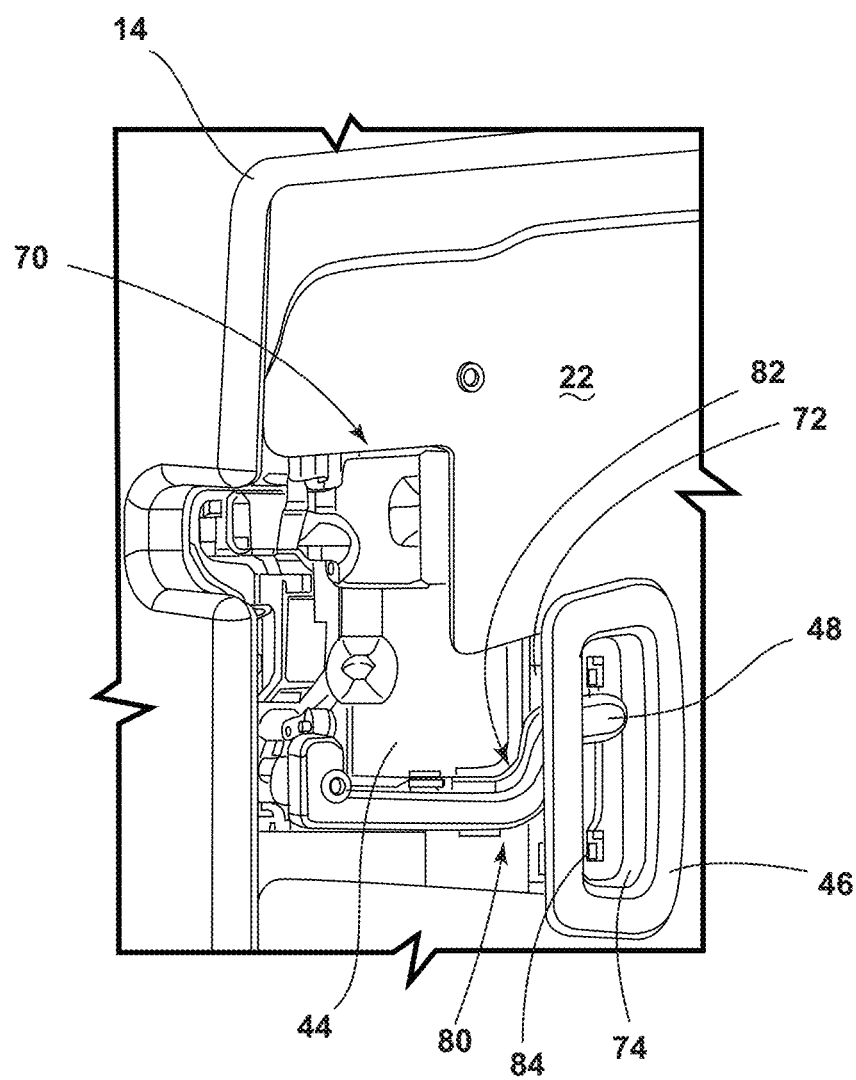
FIG. 2 is a rear perspective, enlarged view of the cargo locking system.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a cargo compartment lock for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

With reference to FIG. 1, reference numeral 10 generally designates a locking system for a vehicle 12 or a locking apparatus 10 for the vehicle 12 comprising a partition 14 for the vehicle 12. The vehicle 12 includes a cabin 16 and a storage space 18. The partition 14 may be a divider. The divider has a first face 20 that defines the cabin 16, and the divider has a second face 22 that defines the storage space 18 that may be a cargo area. An occupant 24 may interact with the first face 20 of the divider, such that the divider may be a seatback. The seatback may be a row of seatbacks. The partition 14 gates off the cargo area 18 from the cabin 16 such that the partition 14 is a gate. While the partition 14 or cargo access panel gates off the cargo area 18 from the cabin 16 in an upright position, the cargo locking apparatus 10 also provides access to the cabin 16 from the cargo area 18 when the gate is in an open position.

With further reference to FIG. 1, the vehicle 12 may include a liftgate 88. The cargo space 18 may be further defined by the liftgate 88. Additionally, or alternatively, the cargo space 18 may be further defined by a cover 86 or tonneau cover 86. The tonneau cover 86 may also be a tray 86. The occupant 24 may activate the liftgate 88 to access the cargo space 18, and from the cargo space 18, the occupant may interact with the cargo locking apparatus 10.

Figure 3A:
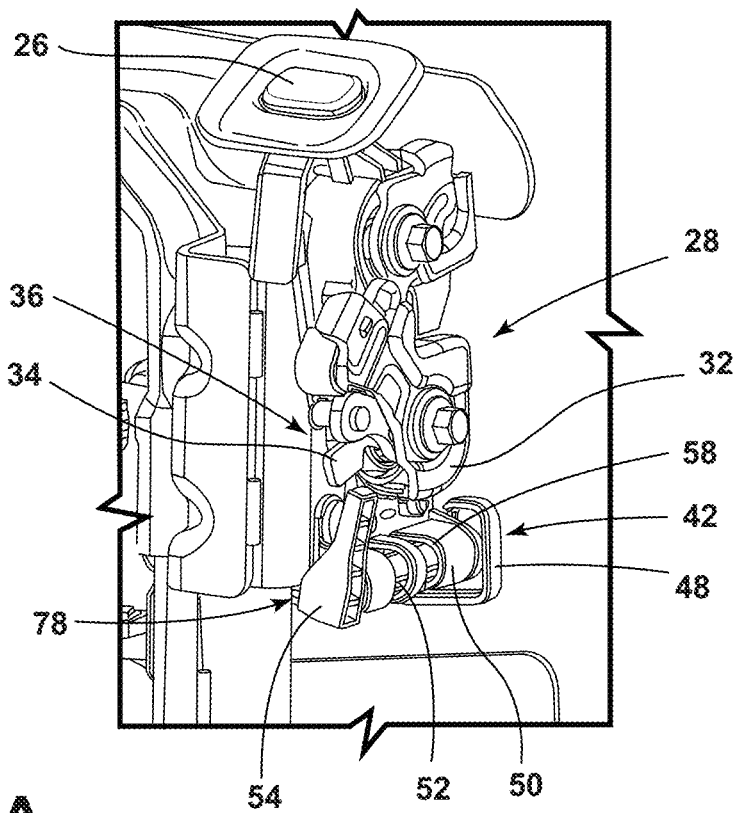
FIG. 3A is a front perspective, enlarged view of the cargo locking system unlocked.
Figure 3B:
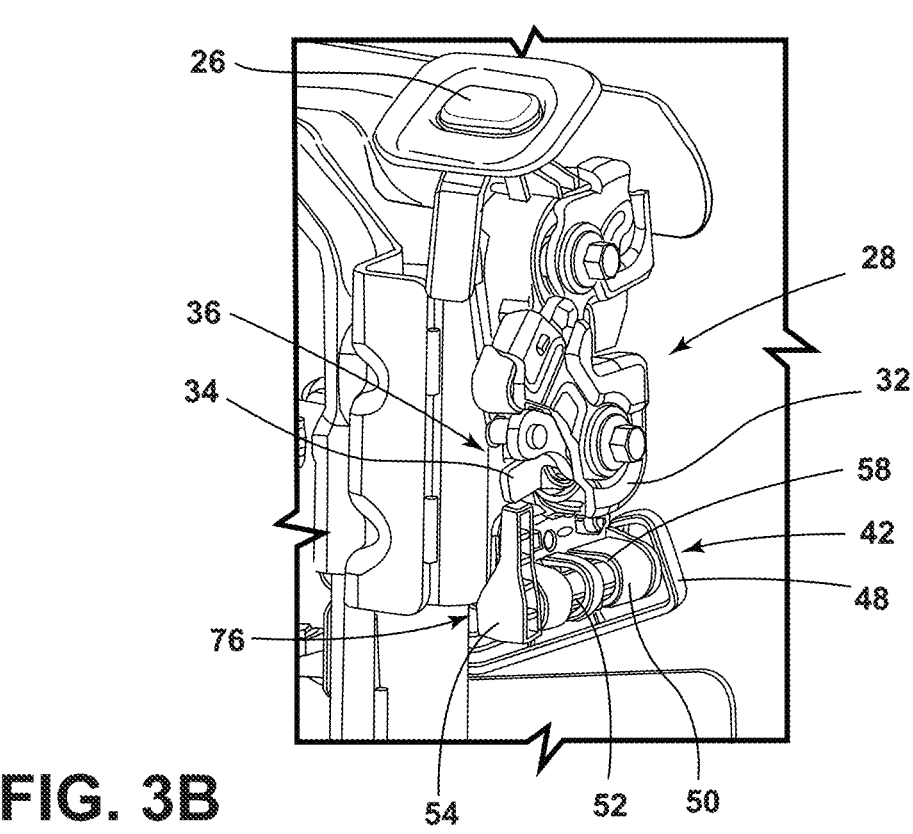
FIG. 3B is a front perspective, enlarged view of the cargo locking system locked.
Figure 4:
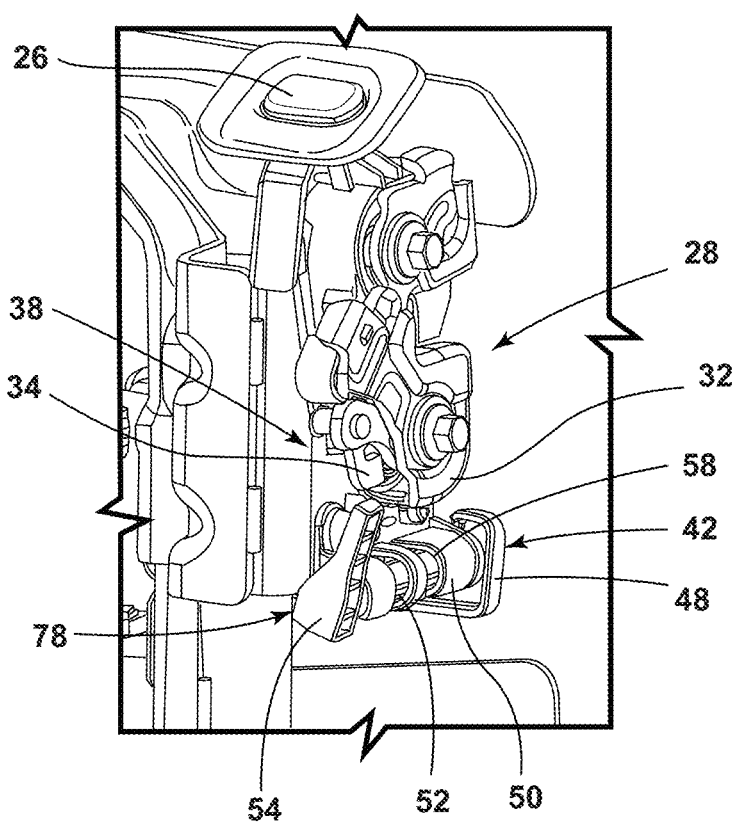
FIG. 4 is a front perspective, enlarged view of the cargo locking system unlocked and pivotable.

With reference to FIGS. 3A-4 the cargo locking apparatus or cargo locking apparatus 10 comprises an actuator 26 that when activated, allows the partition 14 to move between the upright position and the open position. The actuator 26 may be a release actuator. The cargo locking apparatus 10 comprises a pivot assembly 28. The pivot assembly 28 may be located on a lateral side 30 of the partition 14. The pivot assembly 28 comprises a pivot bracket 32 and a pivot latch 34. The pivot latch 34 is coupled with the pivot bracket 32. The pivot latch or latch 34 outwardly extends from the pivot bracket 32. The pivot latch 34 may radially extend from the pivot bracket 32. The pivot assembly 28 may be unitarily formed or the pivot bracket 32 and the pivot latch 34 may be coupled (e.g., welding, bolt connection, etc.). The actuator 26 or release actuator is coupled with the pivot latch 34. The pivot latch 34 is movable between a first position 36 and a second position 38. The actuator 26 is configured to move the pivot latch 34 between the first position 36 and the second position 38 when the actuator 26 is activated. The actuator 26 may be located on a top side 40 of the seatback (e.g., a button, a switch, etc.). The gate or seatback is pivotable between the upright position and the open position when the pivot latch 34 is in the second position 38.

Figure 5:
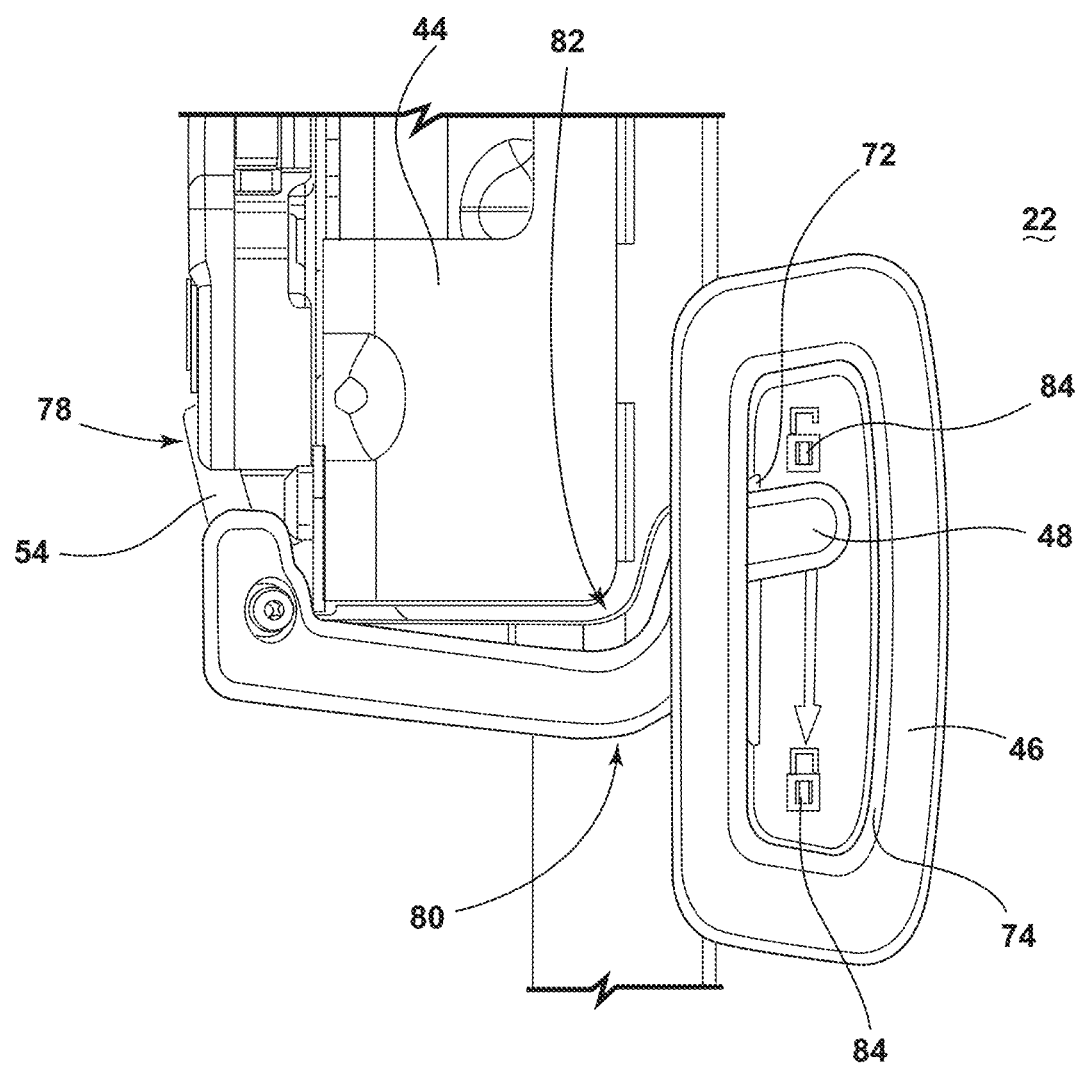
FIG. 5 is a partially exploded view of a locking assembly adjacent to a pivot assembly.
Figure 6A:
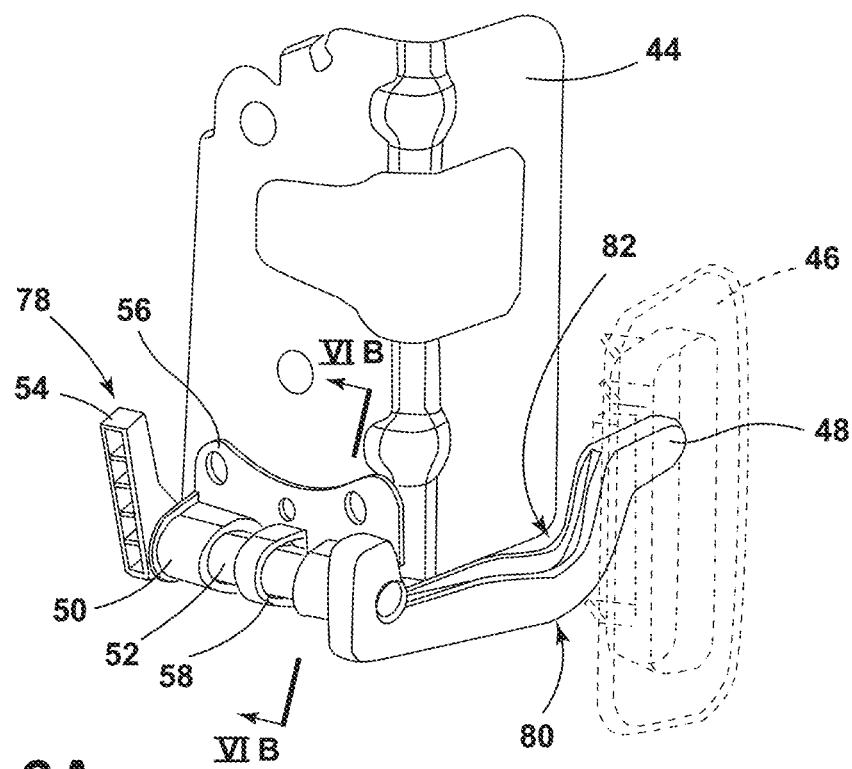
FIG. 6A is a partially exploded, side perspective view of the locking assembly.

Referring to FIGS. 5 and 6A, the cargo locking system 10 or cargo locking apparatus comprises a locking assembly 42. The locking assembly 42 comprises a mounting bracket 44 that is coupled with the partition 14 proximate to the pivot assembly 28. The mounting bracket 44 may be sandwiched between the pivot assembly 28 and the partition 14. The mounting bracket 44 may be coupled with the divider on the lateral side 30. The mounting bracket 44 may extend along the depth of the seatback or the divider. The locking assembly 42 also comprises a housing 46 or a lock cover 46, a lever 48, a sleeve 50, a shaft 52, and a striker 54 or a protruding arm 54.

Figure 6B:
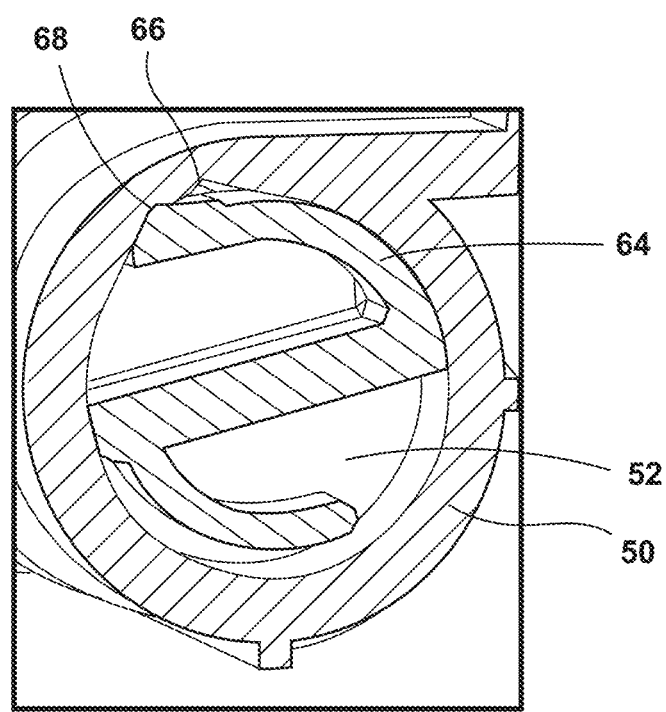
FIG. 6B is enlarged, cross-sectional view of a shaft of the locking assembly taken through line VIB-VIB of FIG. 6A.

With further reference to FIGS. 5-6B, the sleeve 50 is coupled with the mounting bracket 44. The sleeve 50 may include a flange 56 that is coupled with the mounting bracket 44. The sleeve 50 and the mounting bracket 44 may be unitarily formed. The sleeve 50 extends along the depth of the seatback or the divider. The sleeve 50 may define a slot 58 that reveals a partial circumference of the shaft 52. The shaft 52 extends through the sleeve 50 such that the sleeve 50 at least partially circumscribes the shaft 52. The shaft may extend into the depth of the seatback. The shaft 52 comprises a distal end 60 and a proximal end 62 and extends therebetween. The distal end 60 of the shaft 52 is coupled with the striker 54 or the protruding arm 54. The proximal end 62 of the shaft 52 is coupled with the lever 48. The shaft 52 comprises a biasing member 64 that can be seen in FIG. 6B which is a cross section view. The biasing member 64 may be substantially Z-shaped. The biasing member 64 applies a biasing force to the sleeve 50. The sleeve 50 defines a locked notch 66 and an unlocked notch 68 each configured to receive the biasing member 64. The protruding arm 54 or the striker 54, the shaft 52, and the lever 48 may be unitarily formed.

The lock cover 46 or the housing 46 is coupled with the second face 22 of the divider or seatback. The seatback defines a cavity 70 that may house the pivot assembly 28 and the locking assembly 42. The lock cover 46 is coupled with the seatback within the cavity 70 such that the lock cover is substantially flush with the second face 22. The lock cover 46 defines an opening 72 and a recess 74. The lever 48 extends through the opening 72 of the housing or the lock cover 46 into the recess 74.

The lever 48 may be actuated from within the cargo space 18 to rotate the shaft 52 and, therefore, pivot the striker 54. The lever 48 may rotate the shaft 52 by rotating the Z-shaped biasing member 64 within the shaft 52. The striker 54 or the protruding arm 54 and the lever 48 pivots or moves between a locked position 76 and an unlocked position 78. The lever 48 may be actuated mechanically by a user 24, electromechanically via a human-machine interface (HMI), etc. The lever 48 may have a profile 80, as shown in FIGS. 4 and 5, the profile 80 comprising a plurality of curves 82 or a plurality of compound curves 82. The plurality of curves 82 may border the mounting bracket 44. The profile 80 of the lever 48 may interface with the mounting bracket 44 when the striker 54 is in the locked position 76. The locked notch 66 of the sleeve 50 receives the biasing member 64 when the striker 54 is in the locked position 76. The unlocked notch 68 of the sleeve 50 receives the biasing member 64 when the striker 54 is in the unlocked position 78. The biasing member 64 applies a biasing force to the sleeve 50 such that the release latch 34 or the latch is biased toward one of the locked position 76 and the unlocked position 78. The biasing member 64 applies a biasing force to the sleeve 50 such that the lever 48 is biased to extend toward an indicia 84 communicating the locked position 76 and the unlocked position 78.

With reference to FIGS. 3A and 3B, the striker 54 or the protruding arm 54 selectively engages the pivot latch 34. The striker 54 engages the pivot latch 34 when the striker 54 is in the locked position 76. The striker 54 holds the latch 34 in the first position 36 when the striker 54 is in the locked position 76. The striker 54 prevents the latch 34 from moving from the first position 36 toward the second position 38. The striker 54 may inhibit the actuator 26 from moving as well. Alternatively, or additionally, when the striker 54 is in the locked position 76, the actuator 26 may still move without actuating the pivot latch 34 to the second position 38 (e.g., a flip of a switch, a depression of a button, etc.). In other words, when the striker 54 is in the locked position 76, the striker 54 prevents the release actuator or the actuator 26 from actuating the latch or the pivot latch 34 between the first position 36 and the second position 38. The seatback or divider separates the cabin 16 from the cargo area 18 when the striker 54 is in the locked position.

The cargo locking assembly 42 includes the indicia 84 facing the cargo area 18. The indicia 84 may be comprised from the lock cover 46. Additionally, or alternatively, the second face 22 of the divider may comprise the indicia 84. The indicia 84 communicate when the striker 54 or the protruding arm 54 is in the locked position 76 and when the striker 54 is in the unlocked position 78. Additionally, or alternatively, the lever 48 may extend toward the indicia 84 to communicate when the striker 54 is in the locked position 76 or the unlocked position 78. The profile 80 of the lever 48 may interface with the mounting bracket 44 when the striker 54 is in the locked position 76.

Use of the cargo locking system 10 may provide for a variety of advantages. For example, the cargo locking apparatus or the cargo locking system 10 includes a locking assembly 42. Additionally, the cargo locking apparatus 10, is driven by the actuation of the lever 48 to transition the striker 54 between the locked position 76 and the unlocked position 78. The locking apparatus 10 may provide for stored items within the cargo area or storage space 18 to remain within the vehicle 12, specifically in the cargo area 18.

According to a first aspect of the present disclosure, a cargo locking system (for a vehicle) comprises a gate and a pivot bracket coupled with the gate. The cargo locking system also comprises a latch radially extending from the pivot bracket. The latch is movable between a first position and a second position. The cargo locking system also comprises an actuator coupled with the latch. The cargo locking system further comprises a striker coupled with the gate. The striker is movable between an unlocked position and a locked position. The striker holds the latch in the first position when the striker is in the locked position.

According to a second aspect of the present disclosure, a cargo locking system (for a vehicle) comprises a divider separating a cargo space from a cabin space within the vehicle. The cargo locking system also comprises a pivot bracket coupled with the divider. The cargo locking system also comprises a pivot latch movable between a first position and a second position, the pivot latch coupled with the pivot bracket. The cargo locking system also comprises a release actuator coupled with the pivot latch, the release actuator configured to actuate the pivot latch between the first position and the second position. The cargo locking system also comprises a protruding arm selectively engaged with the pivot latch. The cargo locking system also comprises a lever movable between a locked position and an unlocked position. The cargo locking system also comprises a shaft having a proximal end and a distal end and extending therebetween. The proximal end is coupled with the lever. The distal end is coupled with the protruding arm. The cargo locking system also comprises a mounting bracket coupled with the divider and a sleeve coupled with the mounting bracket. The sleeve is configured to house the shaft. The cargo locking system further comprises a lock cover coupled with the divider. The lock cover defines recess that houses the lever. The lock cover is accessed from within the cargo space.

According to a third aspect of the present disclosure, a cargo locking system (for a vehicle) comprises a pivot bracket coupled with a lateral side of a cargo access panel. The cargo locking system also comprises a pivot latch movable between a first position and a second position. The pivot latch outwardly extends from the pivot bracket. The cargo locking system also comprises a release actuator coupled with the pivot latch. The release actuator is configured to actuate the pivot latch between the first position and the second position. The cargo locking system also comprises a protruding arm coupled with the lateral side of the cargo access panel. The protruding arm selectively engages the pivot latch. The cargo locking system also comprises a lever that is accessible from with a cargo space of the vehicle. The lever is coupled with the protruding arm. The lever transition the protruding arm between a locked position and an unlocked position.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A cargo locking system for a vehicle, the cargo locking system comprising:
   a gate;
   a pivot bracket coupled with the gate;
   a latch movable between a first position and a second position, wherein the latch radially extends from the pivot bracket;
   an actuator coupled with the latch;
   a striker coupled with the gate, wherein the striker is movable between a locked position and an unlocked position from within a cargo space, and wherein the striker holds the latch in the first position when the striker is in the locked position; and
   a lever coupled with the striker, wherein the lever actuates the striker between the locked position and the unlocked position from within the cargo space.

2. The cargo locking system of claim 1, wherein the gate pivots to an open position when the latch is in the second position.

3. The cargo locking system of claim 1, wherein activation of the actuator moves the latch between the first positon and the second position when the striker is in the unlocked position, and wherein the actuator is prevented from actuating the latch when the striker is in the locked position.

4. The cargo locking system of claim 1, wherein the gate is a seatback.

5. The cargo locking system of claim 1, wherein the gate includes indicia facing the cargo space, the indicia communicates when the striker is in the locked position and the unlocked position.

6. The cargo locking system of claim 1, wherein the gate defines a cavity, and wherein the pivot bracket, the latch, and the striker are disposed within the cavity.

7. The cargo locking system of claim 1, defining:
   a housing, wherein the lever is accessed from within the housing.

8. A cargo locking system for a vehicle, the cargo locking system comprising:
   a gate;
   a pivot bracket coupled with the gate;
   a latch movable between a first position and a second position, wherein the latch radially extends from the pivot bracket;
   an actuator coupled with the latch; and
   a striker coupled with the gate, wherein the striker is movable between a locked position and an unlocked position from within a cargo space, and wherein the striker holds the latch in the first position when the striker is in the locked position, and wherein the striker applies a biasing force to the gate, and wherein the biasing force directs the striker toward one of the locked position and the unlocked position.

9. A cargo locking system for a vehicle, the cargo locking system comprising:
   a divider separating a cargo space from a cabin space within the vehicle;
   a pivot bracket coupled with the divider;
   a pivot latch movable between a first position and a second position, the pivot latch coupled with the pivot bracket;
   a release actuator coupled with the pivot latch, the release actuator configured to actuate the pivot latch between the first position and the second position;
   a protruding arm selectively engaged with the pivot latch;
   a lever movable between a locked position and an unlocked position;
   a shaft having a proximal end and a distal end and extending therebetween, wherein the proximal end is coupled with the lever, and wherein the distal end is coupled with the protruding arm;

a mounting bracket coupled with the divider;

a sleeve coupled with the mounting bracket, the sleeve configured to house the shaft; and a lock cover coupled with the divider, wherein the lock cover defines a recess that houses the lever, and wherein the lock cover is accessed from within the cargo space.

10. The cargo locking system of claim 9, wherein the shaft comprises a biasing member, wherein the biasing member applies a biasing force to the sleeve.

11. The cargo locking system of claim 10, wherein the sleeve defines a locked notch and an unlocked notch, wherein the locked notch is configured to receive the biasing member when the lever is in the locked position, and wherein the unlocked notch is configured to receive the biasing member when the lever is in the unlocked position.

12. The cargo locking system of claim 9, wherein the lock cover includes indicia of when the lever is in the locked position and the unlocked position.

13. The cargo locking system of claim 9, wherein the divider is a seatback.

14. A cargo locking system for a vehicle, the cargo locking system comprising:

a pivot bracket coupled with a lateral side of a cargo access panel, wherein the cargo access panel is a seatback having a depth;

a pivot latch movable between a first position and a second position, wherein the pivot latch outwardly extends from the pivot bracket;

a release actuator coupled with the pivot latch, wherein the release actuator is configured to actuate the pivot latch between the first position and the second position;

a protruding arm coupled with the lateral side of the cargo access panel, wherein the protruding arm selectively engages the pivot latch;

a lever accessible from within a cargo space of the vehicle, wherein the lever is coupled with the protruding arm, and wherein the lever transitions the protruding arm between a locked position and an unlocked position;

a shaft extending into the depth of the seatback, wherein a first end of the shaft is coupled with the protruding arm, and wherein a second end of the shaft is coupled with the lever; and a sleeve, wherein the sleeve circumscribes the shaft, wherein the shaft includes a biasing member that biases the lever to transition the protruding arm toward one of the locked position and the unlocked position.

15. The cargo locking system of claim 14, wherein the seatback includes indicia communicating toward the cargo space when the protruding arm is in the locked position and the unlocked position.

* * * * *